Figure 1:
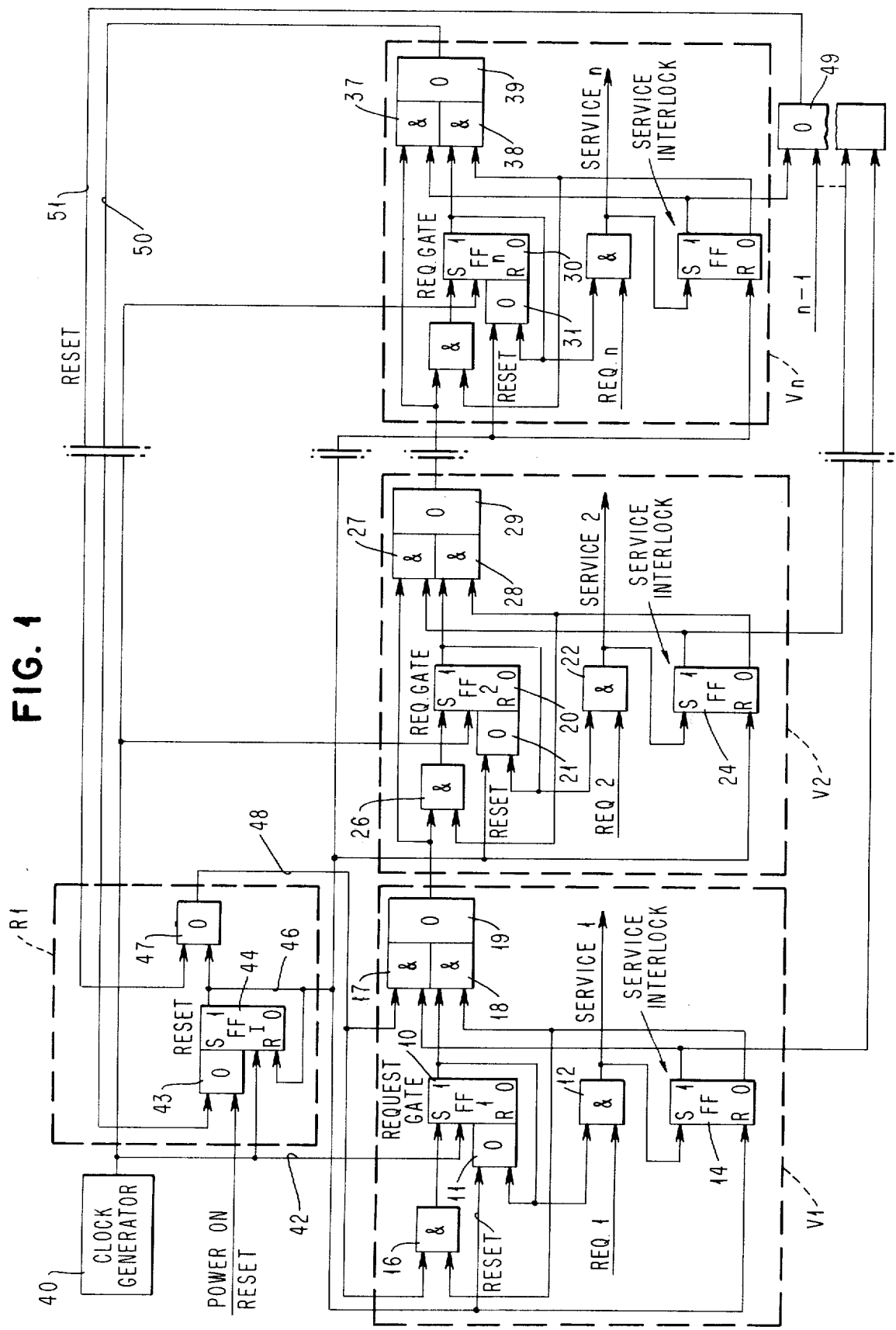

United States Patent [19]
Doehle et al.

[11] 3,947,824
[45] Mar. 30, 1976

[54] PRIORITY CONTROL CIRCUIT

[75] Inventors: Lothar A. Doehle, Herrenberg; Heinz Drescher, Holzgerlingen; Hans H. Lampe, Herrenberg; Werner Pohle, Doeffingen; Peter Rudolph, Schoenaich, all of Germany

[73] Assignee: International Business Machines Corporation, Armonk, N.Y.

[22] Filed: June 17, 1974

[21] Appl. No.: 479,734

[30] Foreign Application Priority Data
July 21, 1973 Germany............................ 2337159

[52] U.S. Cl. .......................................... 340/172.5
[51] Int. Cl.² ................................................ G06F 9/18
[58] Field of Search ................................ 340/172.5

[56] References Cited
UNITED STATES PATENTS

| | | |
|---|---|---|
| 3,735,357 | 5/1973 | Maholick et al.................. 340/172.5 |
| 3,800,287 | 3/1974 | Albright............................ 340/172.5 |
| 3,828,327 | 8/1974 | Berglund et al. ................ 340/172.5 |

*Primary Examiner*—Gareth D. Shaw
*Assistant Examiner*—James D. Thomas
*Attorney, Agent, or Firm*—Robert Lieber

[57] ABSTRACT

A priority control circuit for establishing connections between a data handling system element and a number of subsystems wherein request signals from subsystems are scanned and granted service in a sequence which is determined by their position in a priority ranking order. The scanner returns to the beginning of the order immediately after a request has been granted, the subsystem just serviced being bypassed in the next scan until all of the remaining request signals have been processed. Each time a request signal is encountered and service granted, the scanner returns to the beginning of the order, a new scan is begun and all prior requests serviced are bypassed. In the absence of any other requests or after all of the request signals have been serviced the bypassed subsystems are unlocked and a scan of all requests is begun.

4 Claims, 2 Drawing Figures

PRIORITY CONTROL CIRCUIT

BACKGROUND OF THE INVENTION

1. Field of the Invention

This invention relates to data handling systems and more particularly to apparatus for controlling the granting of service to elements of the system in response to requests for service in accordance with a predetermined priority sequence.

2. Description of Prior Art

In data handling systems information transfer occurs between system elements such as a main system and various subsystems. Some of these subsystems transfer information at a rate higher than other subsystems and, therefore, must be granted service at a rate higher than other subsystem elements. This has given rise to the development of priority circuits for ranking subsystem elements in some predetermined priority order, the higher priority being given to the faster subsystem elements. One prior circuit places the highest priority element in the first priority position in a ranking order. The requests from each element are then examined by taking each element in sequence in the order. This type of circuit has the disadvantage that higher speed subsystems are not again tested for requests until all other subsystems have been serviced.

In order to overcome this shortcoming, priority circuits have been devised which grant the highest priority subsystem service and then return to the high end of the priority ranking order. This type of circuit has the disadvantage that lower priority devices may not receive service for a long period of time since the high priority devices will effectively lock them out.

SUMMARY OF THE INVENTION

A primary object of this invention is to provide a priority circuit in which higher priority elements are given preferential service but not to the entire exclusion of service to lower priority elements over several service cycles.

It is also an object of this invention to provide a priority control circuit which causes a request signal of a particular priority which has just been serviced to be ignored for one request signal priority cycle and to be activated again in the next.

The above objects are accomplished in accordance with the invention by providing means for scanning request signals and for granting service to the first element in the ranking order requesting services. After a request signal has been serviced the scanning returns to the beginning of the sequence and the request just serviced is bypassed (locked out) while the circuit goes on to the succeeding request signals. In the absence of other requests or after all other request signals have been serviced, all locked request signals are unlocked and the cycle starts over.

The invention has the advantage that it ensures that each element emitting a request signal will be serviced within a predetermined time since the unit just serviced is bypassed until all other units have been tested for requests.

The priority circuit has advantages in error detection applications. When error signals are sequentially scanned the occurrance of permanent errors in one of the units may cause errors in a succeeding unit lower in priority. In the present invention when an error occurs in a unit the priority circuit returns to the higher priority units so that the error condition (if caused by a higher priority unit) can be corrected and not propagated to other units.

The foregoing and other objects, features and advantages of the invention will be apparent from the following more detailed description of a preferred embodiment of the invention as illustrated in the accompanying drawings.

Figure 2:
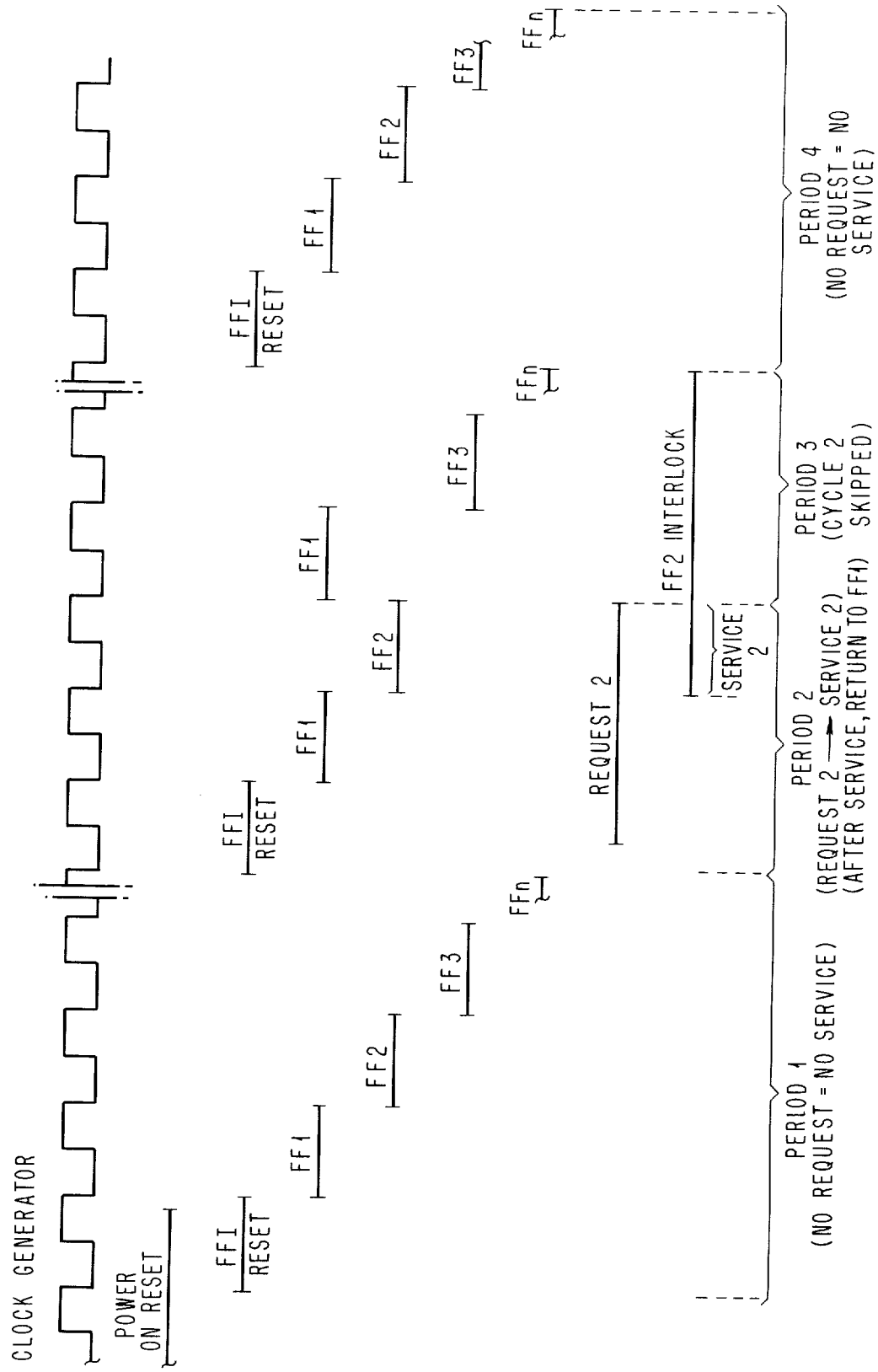

FIG. 1 is a schematic drawing of a priority circuit embodying the present invention and FIG. 2 is a timing circuit illustrating the timing relationship among the various elements of FIG. 1.

DESCRIPTION

Referring to FIG. 1, the priority circuit of the present invention is comprised of a number of stages $V_1$, $V_2$ . . . $V_n$. The priority circuit stages are driven by a clock generator 40 which produces a series of pulses on its output 42. A clock circuit $R_1$ is provided which includes a flip flop 44 which is set to its one state by the coincidence of a downward shift on the clock generator output 42 and a positive input to the set (S) input of the flip flop. The outputs 46 and 48 from the clock circuit are used to gate the priority circuit as will be described subsequently.

$V_1$ is a typical stage of the priority circuit. The stage receives a request on the request 1 line at the AND circuit 12. If the request-gate flip flop 10 is energized then priority will be granted to request 1 and an output service 1 is generated from stage $V_1$.

A service interlock flip flop 14 is provided to function as a latch which remembers that service was granted to this stage. Flip flop 14 is turned on by the service 1 line going positive. The flip flop 14 is reset at the end of the cycle after all the stages of the priority circuit have been tested for service.

The AND circuits 17 and 18 feed on OR circuit 19. The function of these circuits is to pass priority to the next stage in the priority ranking order. Priority is passed to the next stage upon the condition that either the preceding stage does not want service or the preceding stage was granted service in the same cycle. This is accomplished by combining the output of flip flop 14 and the output of flip flop 10. If flip flop 10 is on, this means that the stage $V_1$ is conditioned to grant service if a request is received. Normally flip flop 14 is off thereby energizing AND circuit 18. This allows a signal to pass through $OR_{19}$ to the next stage, conditioning flip flop 20 to be turned on by the negative shift of clock output 42. Therefore, priority passes to the next stage. When a request is received at stage $V_1$ an output from AND circuit 12 occurs and turns on flip flop 14. This causes the input to AND 18 to go negative thereby preventing the positive level from the output of flip flop 10 from passing through OR circuit 19 to the next stage. However, with flip flop 14 now on, AND 17 is energized, and OR 49 is energized. Output 51 of OR 49 energizes OR 47. Output 48 of OR 47 energizes the other leg of AND 17. This allows a signal to pass through OR 19 to the next stage, conditioning flip flop 20 to be turned on by the negative shift of clock output 42. This causes the priority to pass to the next stage thereby allowing the next stage to grant service if a request is received.

The purpose of the request-gate flip flops (10, 20, etc.) is to allow service to be granted to a stage of the priority circuit at a fixed time in a cycle. This is done by turning on the request-gate flip flop with a clock pulse that is conditioned by a line from the next preceding stage. If the next preceding stage or stages were granted service then the request gate flip flop is turned on immediately by the clock pulse without the previous request-gate being on.

The purpose of the service-interlock flip flop is to remember that service has been granted to a stage. The flip flop is turned on whenever the service line is energized and is turned off only after all stages have been tested for requests. The service-interlock flip flop bypasses the request-gate flip flop of a stage to condition the next stage for service, thereby bypassing the stage already granted service. Once a service-interlock flip flop is turned on, it immediately conditions the highest order stage to cause the cycle to start over from the top of the ranking order.

The clock generator 40 generates an output 42 which is fed to the input of flip flops 10, 20, 30 and 44. These flip flops will change state depending upon whether the set or reset inputs have been previously energized. Before the first cycle can begin the power on reset line to the clock circuit $R_1$ is energized. This causes the set input of flip flop 44 to be energized and a pulse 46 occurs from the output of flip flop 44. The line 46 energizes the reset side of all flip flops in the circuits $V_1, V_2 \ldots V_n$. All the circuits remain reset until a request is received on one of the request lines.

Referring to the timing diagram of FIG. 2, during period 1 no request for service is received. The cycle is started by a power on reset which causes reset flip flop 44 (FFI) to turn on when a negative shift occurs from the output 42 of clock generator 40. Since the output 46 of the flip flop 44 is brought back to its reset input, the flip flop stays on for only one cycle of the clock and is turned off with the next negative shift. With the output 46 energized the reset side of all of the flip flops 10, 20, 30 is energized by means of corresponding OR circuits 11, 21, 31. At the next negative shift of the clock generator output flip flop 10 (FF1) is turned on because AND circuit 16 is energized. AND circuit 16 is energized because flip flop 44 is on the flip flop 14 is off. Since no request is received flip flop 14 remains off and the output of flip flop 10 is passed through AND circuit 18 and OR circuit 19 to the next stage. The output of OR circuit 19 energizes AND 26. Since flip flop 24 is off an output from AND 26 occurs and energizes flip flop 20. Since service interlock flip flop 24 is off in this stage the output of flip flop 20 is propagated to the next stage through AND circuit 28 and OR circuit 29. This process is repeated from stage to stage until at stage N the output from OR circuit 39 is fed back by means of line 50 to the clock circuit $R_1$. The line 50 performs the same function as the power on reset so that the next cycle is automatically taken.

During period 2 a request is received from the Request 2 line at stage $V_2$. This request may occur at any point in the cycle. As in the first cycle the cycle is started by an output from flip flop 44 which energizes AND 16. At the next negative shift of the clock generator output 42 flip flop 10 is turned on. Since no request has been received at stage $V_1$ flip flop 14 remains off and the output of flip flop 10 is passed through AND circuit 18 and OR circuit 19 to stage $V_2$. The output of OR circuit 19 energizes AND circuit 26. Since service interlock flip flop 24 is off an output from AND 26 occurs and energizes the set input of flip flop 20. The output of flip flop 20 energizes AND circuit 22. Since the Request 2 line is energized a service 2 output occurs granting service to this stage and turning on service interlock flip flop 24. Once service interlock flip flop 24 turns on the succeeding stages are skipped and the scanning sequence reverts back to stage $V_1$. This is accomplished by the energization of OR circuit 49 which is energized by the output of service interlock flip flop 24. The output 50 of the OR circuit 49 energizes OR circuit 47 at clock generator $R_1$ which sets up the stage VI for a new cycle. The service interlock flip flop 24 being on prevents a signal from propagating through stage V2 to the next succeeding stages thereby preventing these stages from taking cycles. This is accomplished by the zero output of flip flop 24 which when energized degates AND circuit 28 thus preventing the output of flip flop 20 from passing therethrough.

During Period 3 stage $V_2$ is skipped in the following manner. The cycle is started by an output 48 from the clock generator circuit which energizes AND circuit 16. Since service interlock flip flop 14 has remained off an output from AND 16 energizes the set input flip flop 10 so that it changes its state in response to clock generator output 42. Flip flop 10 being energized causes an output from AND circuit 18. An output from OR circuit 19 therefore occurs which energizes both AND circuits 26 and 27. No output from AND circuit 26 occurs, however, because this AND circuit is disenergized by the zero output of service interlock flip flop 24. In this manner stage $V_2$ is prevented from being granted a service cycle. The output of OR circuit 19 also energizes AND circuit 27 and since service interlock flip flop 24 is on, an output from AND circuit 27 passes through the next stage through OR circuit 29. The request gate flip flop of the next stage will therefore turn on allowing this stage to grant service if a request is received. The cycle continues until a stage having a request is encountered in which event the cycle begins again at the first stage, or until the last stage $V_n$ is reached at which point an output from OR circuit 39 occurs energizing line 50. Line 50 causes a reset function from the clock generator circuit $R_1$ to occur. This is accomplished in the same manner as described for power on reset wherein the OR circuit 43 is energized thus turning on flip flop 44. Once flip flop 44 turns on an output 46 is passed through all of the flip flops in the circuits $V_1, V_2, \ldots V_n$ thus resetting the circuits to their initial states.

During period 4 no requests for service occur and period 4 is identical to period 1 wherein the cycle was initiated by a power on reset. The exception is that during period 4 the cycle was initiated by a reset which was forced by an output from the last stage $V_n$ at the end of period 3.

SUMMARY

Briefly, this priority circuit functions in a manner in which request lines are scanned in a predetermined priority sequence. If a request is encountered on a given line when the line is scanned, service is granted and an interlock is turned on. As soon as the interlock turns on the scanning sequence reverts to the beginning of the priority order and the request lines are again scanned. On this second scan the request line which was granted service is skipped by means of a bypass circuit which is put into operation by the interlock device. If a request is encountered during this second scan, service is granted and the corresponding interlock for that request is turned on. This interlock also causes the scanning to revert back to the beginning of the priority order. On this third scan, all request lines for which interlocks are on are bypassed. This mode of operation continues until all outstanding requests have been honored or all request lines have been scanned. The last request line in the priority order when scanned causes an output which resets the circuit so that all interlocks are now off.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. For use with a plurality of system elements arranged in a ranking order, wherein said elements independently issue request signals for service, a priority circuit comprising:
   means for cyclically scanning said request signals in a sequence determined by said ranking order;
   means responsive to said scanning means in each scan cycle for granting service to the first element in the ranking order which emits a request signal;
   plural interlock means associated with individual said elements and activated to energized condition from unenergized condition by said service granting means, for selectively bypassing said request signal of each said first element when energized; and
   means responsive to said interlock means for causing said scanning means to reinitiate the cycle of scanning of said request signals, starting at the beginning of said sequence determined by said ranking order and skipping over requests having associated interlocks energized, when service is granted to one of said request signals.

2. The combination according to claim 1 including means operative conditionally upon the scanning of the last request signal in said ranking order for resetting all of said interlock means to unenergized condition.

3. A priority circuit comprising:
   a plurality of request lines;
   means for scanning said request lines cyclically in a predetermined scanning sequence in accordance with a predetermined priority order;
   means for conditionally granting priority service to requests manifested on said lines;
   means responsive to said scanning means for generating a first signal indicating that priority service has been granted to a particular said request;
   interlocking means associated with individual said request lines for conditioning said scanning means for bypassing respective said lines;
   means responsive to said first signal for energizing the interlocking means associated with said particular request line;
   means responsive to said energized interlocking means for generating a second signal; and
   means responsive to said second signal for causing said scanning means to revert to the beginning of its scanning sequence and initiate a new cycle of scanning;
   whereby a service signal generated upon the granting of service to a request signal during the period of time the respective request line is scanned during said scanning cycle energizes said interlocking means to bypass said respective request line for the next and all succeeding scan cycles until all requests have been serviced.

4. A priority control circuit, useful for establishing connections between several independent parts and one common part of a data processing system, in particular between the external units associated with individual input/output lines and the central storage, individual request signals from said independent parts being cyclically scanned and conditionally serviced in predetermined sequence in accordance with their priority, characterized by:
   means operative after a request signal has been serviced for initiating a new scan cycle and returning scanning to the beginning of the predetermined sequence;
   and means for conditioning the bypassing of a request just serviced in succeeding scan cycles to prevent further scanning of said request until all other unserviced requests have been scanned;
   whereby in the absence of other unserviced requests or after all requests have been serviced all bypass conditions held by said conditioning means may be released.

* * * * *